US009363371B2

(12) United States Patent
Kelly et al.

(10) Patent No.: US 9,363,371 B2
(45) Date of Patent: Jun. 7, 2016

(54) VOICEMAIL INTERACTIVE VOICE RESPONSE FOR INSTANT APPOINTMENT BOOKING

(71) Applicant: TimeTrade Systems, Inc., Tweksbury, MA (US)

(72) Inventors: Brian Kelly, Tewksbury, MA (US); Gary Ambrosino, Tewksbury, MA (US)

(73) Assignee: TimeTrade Systems, Inc., Tewksbury, MA (US)

( * ) Notice: Subject to any disclaimer, the term of this patent is extended or adjusted under 35 U.S.C. 154(b) by 0 days.

(21) Appl. No.: 14/594,540

(22) Filed: Jan. 12, 2015

(65) Prior Publication Data
US 2015/0281441 A1 Oct. 1, 2015

Related U.S. Application Data

(60) Provisional application No. 61/972,509, filed on Mar. 31, 2014.

(51) Int. Cl.
H04M 1/64 (2006.01)
H04M 3/493 (2006.01)
H04M 3/533 (2006.01)
H04M 3/48 (2006.01)

(52) U.S. Cl.
CPC ............... H04M 3/493 (2013.01); H04M 3/48 (2013.01); H04M 3/533 (2013.01); H04M 3/53308 (2013.01); H04M 2203/2072 (2013.01)

(58) Field of Classification Search
CPC ...................................................... H04M 3/48
See application file for complete search history.

(56) References Cited

U.S. PATENT DOCUMENTS

| 5,329,578 | A | * | 7/1994 | Brennan | H04W 8/18 379/196 |
| 5,544,321 | A | * | 8/1996 | Theimer | G06F 21/35 380/258 |
| 5,555,291 | A | * | 9/1996 | Inniss | H04M 1/6505 379/72 |
| 5,812,865 | A | * | 9/1998 | Theimer | G06F 9/547 379/88.13 |
| 5,872,841 | A | * | 2/1999 | King | H04M 3/432 379/205.01 |
| 5,974,453 | A | * | 10/1999 | Andersen | H04L 61/10 709/220 |
| 5,982,863 | A | | 11/1999 | Smiley et al. | |
| 8,027,447 | B2 | * | 9/2011 | Sylvain | H04M 3/42102 379/201.06 |

(Continued)

OTHER PUBLICATIONS

International Search Report and Written Opinion in counterpart International Application No. PCT/US15/22447, mailed Jul. 7, 2015, 9 pages.

(Continued)

Primary Examiner — Joseph T Phan
(74) Attorney, Agent, or Firm — Edell, Shapiro & Finnan, LLC

(57) ABSTRACT

A system and method are provided that transforms the typical voicemail interaction into one in which the client does not feel that their voice messages could be easily ignored. Instead of being prompted in the traditional manner to simply leave a message, the client is asked to choose from a list of available times, each representing a potential time for the service provider to call the client back. The system is aware of both the service provider's calendar appointments and the times that they have made available for client appointments. Once the client chooses a time slot, the service provider's calendar will be updated with the new appointment details. When that time arrives, the provider's calendar system will alert them of their impending appointment and they will be reminded to telephone back their client at the scheduled time.

22 Claims, 5 Drawing Sheets

(56) References Cited

U.S. PATENT DOCUMENTS

| | | | |
|---|---|---|---|
| 8,868,427 B2* | 10/2014 | Rysenga | G06Q 10/109 340/521 |
| 2002/0085701 A1* | 7/2002 | Parsons | H04M 3/54 379/211.01 |
| 2004/0034700 A1* | 2/2004 | Polcyn | H04Q 3/625 709/223 |
| 2006/0036478 A1 | 2/2006 | Aleynikov et al. | |
| 2006/0045255 A1* | 3/2006 | Peters | H04M 3/523 379/265.09 |
| 2006/0256949 A1 | 11/2006 | Noble, Jr. | |
| 2007/0047522 A1* | 3/2007 | Jefferson | H04L 12/581 370/352 |
| 2007/0206747 A1* | 9/2007 | Gruchala | H04M 3/38 379/142.01 |
| 2007/0274495 A1 | 11/2007 | Youd et al. | |
| 2007/0280460 A1 | 12/2007 | Harris et al. | |
| 2008/0040274 A1 | 2/2008 | Uzo | |
| 2009/0296907 A1 | 12/2009 | Vendrow et al. | |
| 2009/0316688 A1* | 12/2009 | Meenavalli | H04L 29/06027 370/352 |
| 2011/0009707 A1 | 1/2011 | Kaundinya et al. | |
| 2014/0045463 A1 | 2/2014 | Hsieh et al. | |
| 2014/0162609 A1 | 6/2014 | Chien | |

OTHER PUBLICATIONS

International Search Report and Written Opinion in counterpart International Application No. PCT/US15/22443, mailed Jul. 6, 2015, 9 pages.

Office Action for U.S. Appl. No. 14/594,525, dated May 21, 2015, 17 pages.

* cited by examiner

VOICEMAIL INTERACTIVE VOICE RESPONSE FOR INSTANT APPOINTMENT BOOKING

CROSS REFERENCE TO RELATED APPLICATION

This application claims priority to U.S. Provisional Application No. 61/972,509, filed Mar. 31, 2014, the entirety of which is incorporated herein by reference.

TECHNICAL FIELD

The present disclosure relates to interactive voice response systems and calendaring systems.

BACKGROUND

"Phone tag" is a very common and annoying occurrence in the business world. This occurs when a caller (client) makes a telephone call to a service provider, but the service provider is not reachable at the time of their call. The service provider may be on another call, on vacation, at lunch, out sick, etc. The client will usually have to leave a voicemail message to indicate their wish to talk with the service provider and give some indication as to the purpose of their call. Unfortunately, there is no guarantee of when or if the provider will call their client back, leading to dissatisfaction on the part of the client, and potentially a loss of revenue on the part of the service provider

SUMMARY

The invention transforms the typical voicemail interaction into one where the client does not feel that their voice messages could be easily ignored. Instead of being prompted in the traditional manner to simply leave a message, the client is asked to choose from a list of available times, each representing a potential time for the service provider to call the client back. Importantly, the system is aware of both the service provider's calendar appointments and the times that they have made available for client appointments. Once the client chooses a time slot, the service provider's calendar will be updated with the new appointment details. When that time arrives, the service provider's calendar system will alert them of their impending appointment and they will be reminded to telephone back their client at the scheduled time.

DETAILED DESCRIPTION OF EXAMPLE EMBODIMENTS

Figure 1:
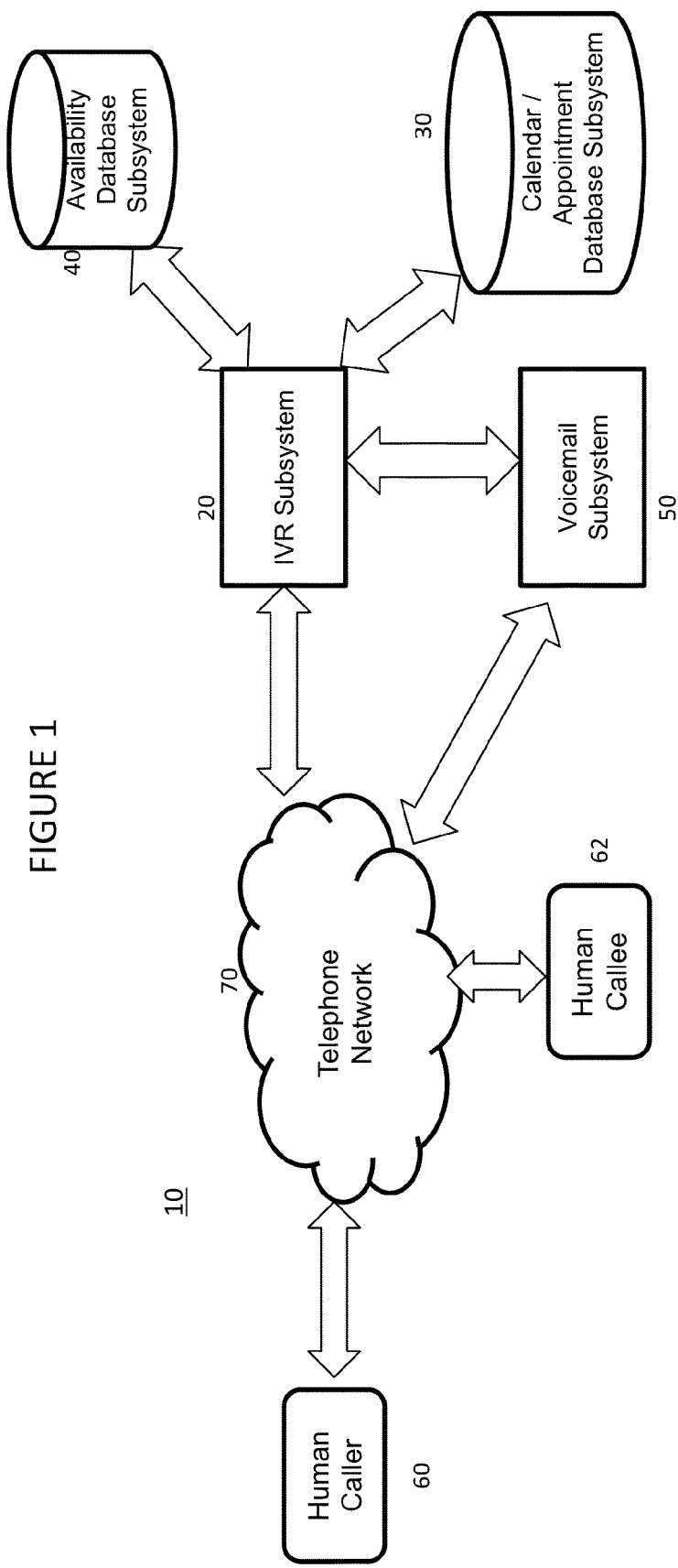
FIG. 1 shows the components of the IVR system and how they are connected, according to an example embodiment.
Figure 2:
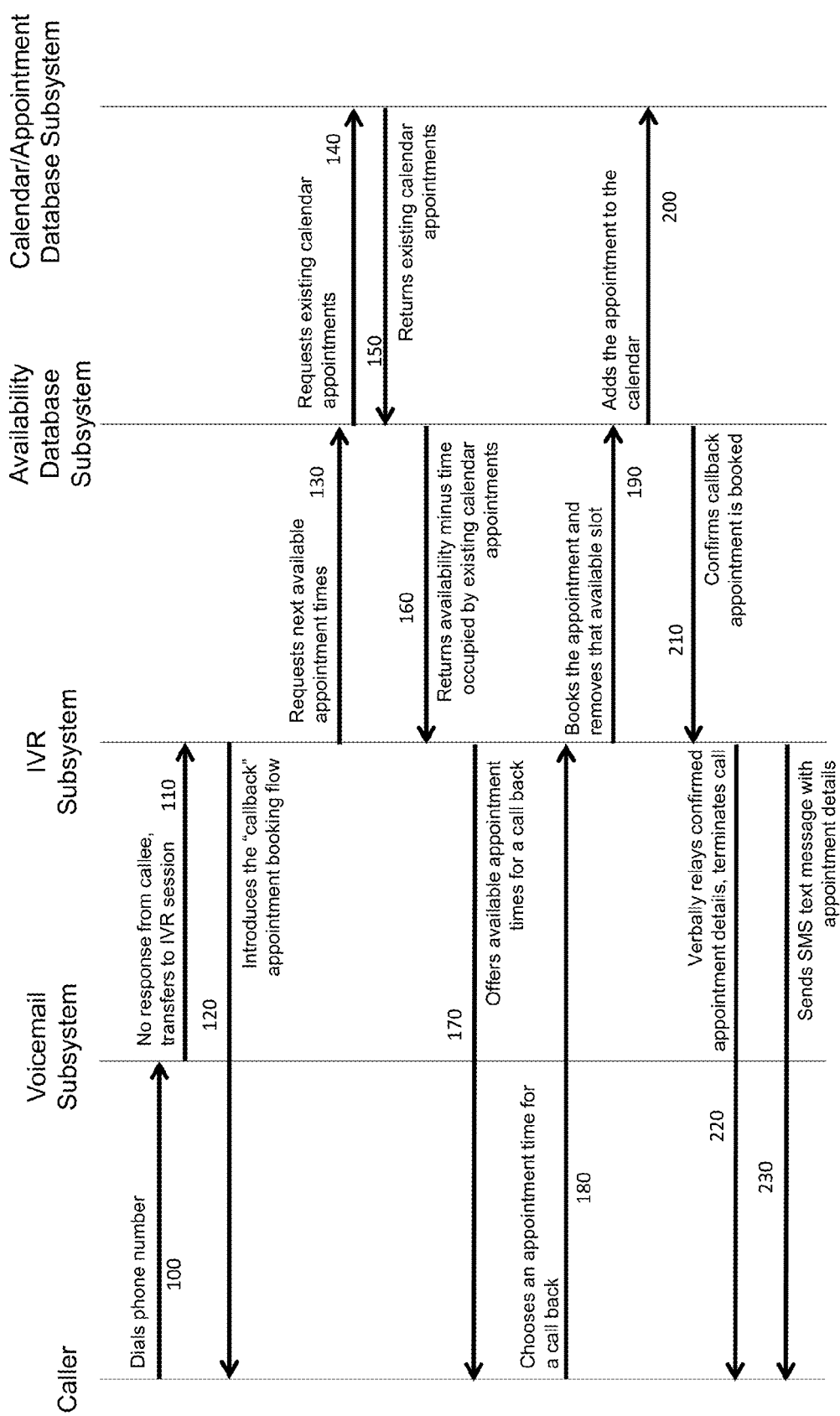
FIG. 2 shows an example of flow of a conversation between a human caller (client) and the system for one particular configuration of the system, according to an example embodiment.
Figure 3:
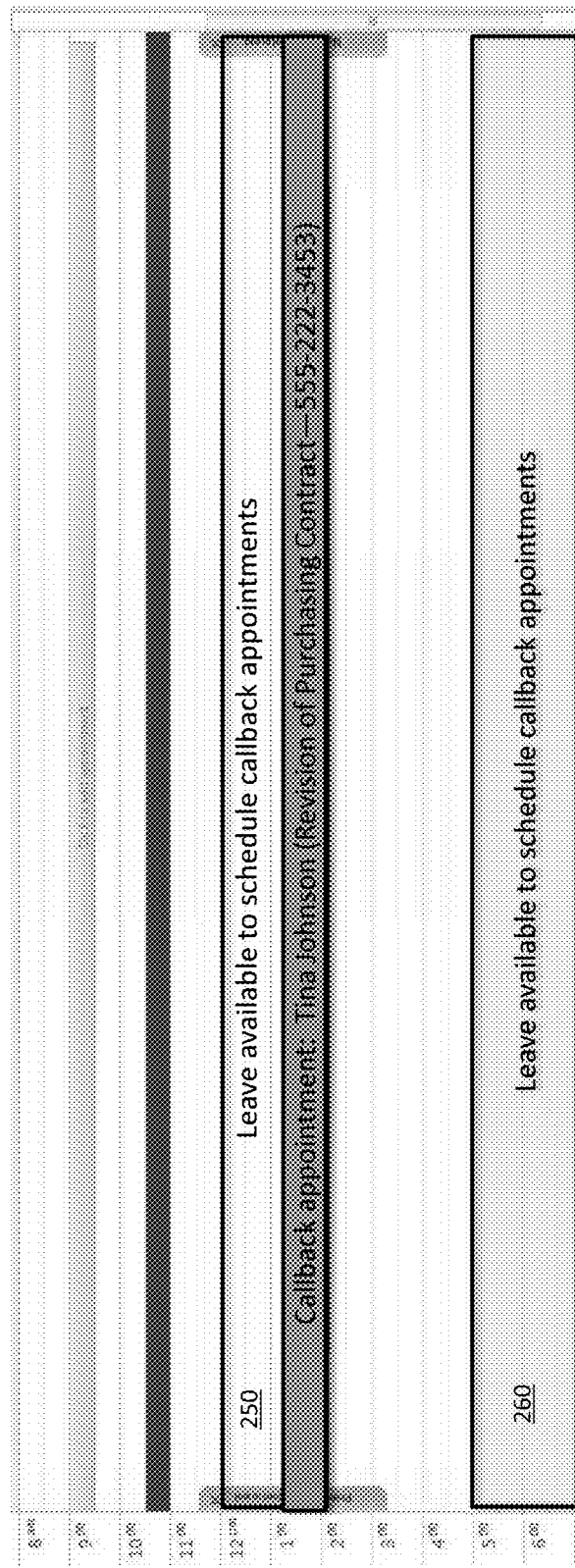
FIG. 3 illustrates a technique for reserving/designating certain time slots to remain available for callback appointments, according to an example embodiment.

Reference is made to FIGS. 1-3 for purposes of the description provided below.

The system and method presented brings together the technologies of voicemail, Interactive Voice Response (IVR), Short-Messaging Service (SMS) and calendaring to provide a convenient experience to telephone callers (referred to as clients herein) trying to reach service providers or colleagues. The invention is an integrated system that is capable of handling incoming telephone calls and is able to take control of the call at the moment when a simple voicemail would normally be recorded, and instead begin an IVR session with the caller to book/schedule a time for the callee to telephone them (the client) back.

Reference is first made to FIG. 1. FIG. 1 illustrates a system 10 that includes an IVR subsystem 20, a calendar/appointment database subsystem 30, an availability database subsystem 40, and a voicemail server/subsystem 50. A human caller (using any phone device, wired-landline, wireless cellular phone, etc.) is shown at reference numeral 60 and a human callee (having an associated wired-landline or wireless cellular phone) is shown at reference numeral 62. Both the IVR subsystem 20 and the voicemail subsystem 50 are connected to the telephone network 70, and are in communication with each other. In addition, the IVR subsystem 20 is in communication with the calendar/appointment database subsystem 30 and with the availability database subsystem 40.

It should be understood that the functions of the availability database subsystem 40 and the calendar/appointment database subsystem 30 may be performed by one computing subsystem or separate computing subsystems. Thus, the term "calendar subsystem" may refer to the combination of the availability database subsystem calendar appointment/database subsystem 30 and the availability database subsystem 40.

Reference is now made to FIG. 2, with continued reference to FIG. 1, for a description of the call flow, according to an example embodiment. A typical interaction with the system will start with the caller telephoning the phone number of the person (callee) with whom he/she wishes to speak.

At 100, a caller places a call to a callee. Once the voicemail subsystem determines that the callee is unavailable (either because they are busy on the same line already or because their configured maximum number of rings have occurred), the call is transferred to the IVR subsystem at 110. At 120, the IVR subsystem begins a session with the caller. The IVR subsystem uses IVR technology to play out audio announcing to the caller that the caller has an can be directed to be directed into a callback appointment scheduling process or can leave a voice mail message for the callee. If the caller decides to decline scheduling a callback appointment, the caller may be allowed to leave a voicemail message in the traditional manner. The IVR system is capable of parsing voice audio commands of the caller and then taking those commands and relaying them to the calendar/database subsystem and availability database subsystem that stores information indicating when appointments with the callee can be booked.

Thus, if the caller elects to choose a time for a future callback from the callee, the IVR subsystem immediately queries the availability data and calendar appointments for the callee. The IVR system will then offer the caller some available appointment times and request that they select one of those times. Specifically, at 130, the IVR subsystem communicates with the availability database subsystem 40 to request next available appointment times with the callee, when the callee can return the call to the caller. At 140, the availability database subsystem communicates with the calendar/appointment database subsystem 30 to request existing calendar appointments for the callee. At 150, the calendar/appointment database subsystem 30 returns the existing calendar appointments to the availability database subsystem 40. At 160, the availability database subsystem 40 returns the availability of the callee (minus times occupied by existing calendar appointments of the callee).

At 170, the IVR subsystem uses the information received at 160 to play out to the caller audio announcing available appointment times for a call back from the callee along with a prompt to the caller to choose an appointment time from the available appointment times. This voice-based interaction allows the caller to quickly choose a time for the callee to telephone the caller (the client) back.

At 180, the caller can choose an appointment time for a call back from the caller. This selection may be made by voice audio from the caller, appropriate recognized by the IVR subsystem. The IVR subsystem receives the selected appointment time from the caller, and may ask the caller for some of his/her personal details. Due to the presence of Caller ID in the caller's call, the caller's phone number will most likely already be known to the system, and perhaps the name and other details too if the caller is linked to the same phone number in the callee's contacts database. However, the caller can be prompted for other personal details such as name and local zip code. The system is configurable and can be instructed to collect arbitrary pieces of personal data before booking the appointment.

Once the caller chooses a callback time, the IVR subsystem, at 190, sends a communication to the availability database subsystem to record/book the appointment on the callee's calendar system to ensure that the callee's calendar is up to date with this new automatic commitment of the callee's future time. The availability database subsystem, at 200, sends a message to the calendar/appointment subsystem to add the appointment to the callee's calendar. At 210, the availability database subsystem confirms the callback appointment to the IVR subsystem 20.

The caller can be made aware of the future appointment confirmation through an informational Short-Messaging System (SMS) text message to a phone if he/she is calling using a cellular phone and also opts-in to receive such a notification during the IVR session. Other forms of notification may include an email message or the play out of audio announcing confirmation of the appointment. Once the caller is informed of their confirmation number the telephone call will be terminated.

Thus, at 220, the IVR subsystem plays out audio to verbally relay the confirmed appointment details and terminates the call. Alternatively, or in addition, at 230, the IVR subsystem sends an SMS text message with appointment details to the caller.

The appointment availability presented to the caller is a subset of the callee's overall "free time" on their calendar system. Computer calendar systems typically only offer the ability to create, move, or cancel appointments, and they do not contain a feature that would allow an individual to specify the times at which they would like to offer appointments to their callers. FIG. 3 illustrates a capability in which a callee can designate certain time windows on his/her calendar that are to be kept available to schedule callback appointments for callers who call the callee but the callee is not available to take the call at the time the callers call. For example, as shown in FIG. 3, at reference numerals 250 and 260, the callee has designated the time slots 12-2 and 5-6 as time periods when callback appointments can automatically be made with callers. Data representing these designated time slots is stored by the calendar subsystem. Moreover, as callback appointments are made, the calendar subsystem adjusts the available appointment times accordingly so that time slots do not become double-booked. For example, as shown in FIG. 3, a callback appointment is scheduled from 1:00 to 1:30 pm with caller Tina Johnson (whose telephone number is 555-222-3453 concerning "revision of purchasing contract").

Figure 4:
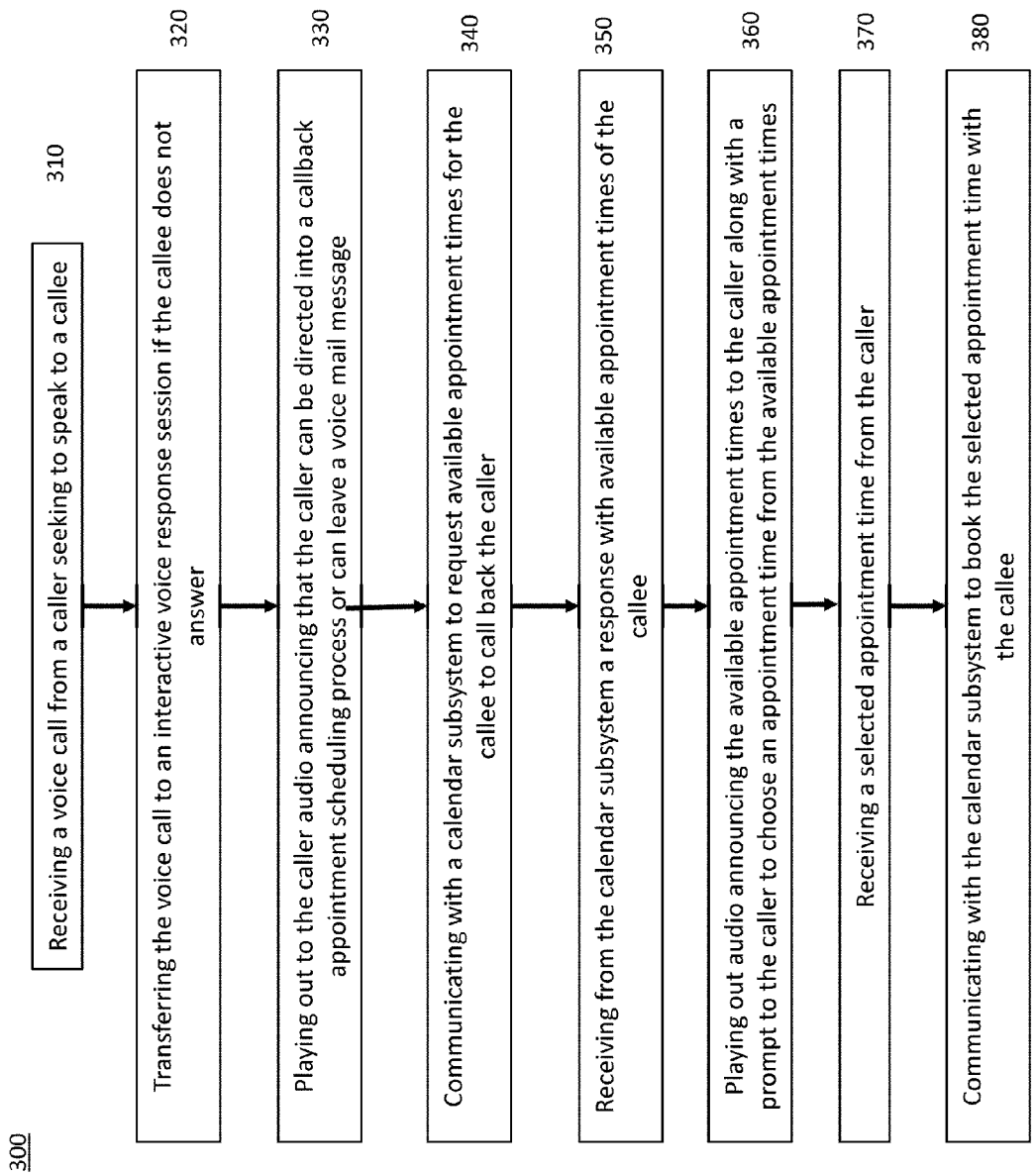
FIG. 4 is a flow chart illustrating a process according to an example embodiment.

The separate but integrated availability database subsystem is used to create appointment availability windows that would serve as the basis for such a capability, and the system is aware of the callee's calendar to ensure that any calendar-based appointment or meeting would subtract from the callee's availability and prevent double bookings FIG. 4 is a flow chart depicting a process 300 performed by the IVR subsystem 20 according to an example embodiment. At 310, a voice call is received from a caller seeking to speak to a callee. At 320, the voice call is transferred to an interactive voice response session if the callee does not answer. At 330, audio is played out to the caller announcing that the caller can be directed into a callback appointment scheduling process or can leave a voice mail message. At 340, communication is made with a calendar subsystem to request available appointment times for the callee to call back the caller. At 350, a response with available appointment times is received from the calendar subsystem. At 360, audio is played out announcing the available appointment times to the caller along with a prompt to the caller to choose an appointment time from the available appointment times. At 370, a selected appointment time is received from the caller. At 380, communication is made with the calendar subsystem to book the selected appointment time with the callee.

Figure 5:
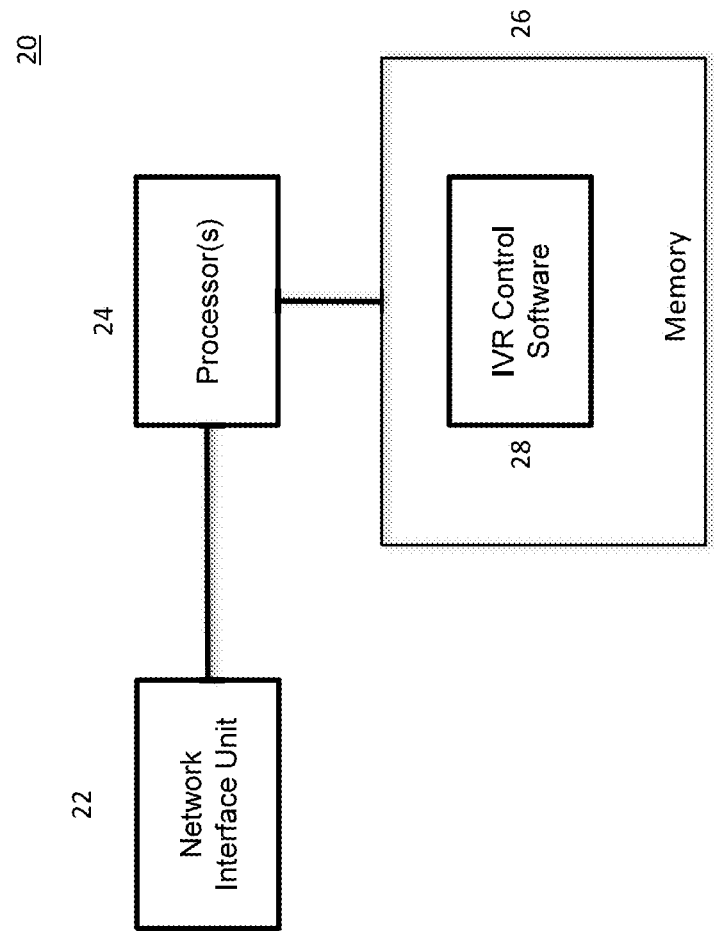
FIG. 5 shows a block diagram of the IVR system, according to an example embodiment.

FIG. 5 shows an example block diagram of the IVR subsystem 20, which includes a network interface unit 22 that interfaces with the telephone network, as well as the other entities shown in FIG. 1, if needed. The IVR subsystem 20 further includes one or more processors 24 and a memory 26 that stores IVR control software 28. The IVR control software 28 includes instructions that, when executed by the one or more processors, causes the IVR system to perform the operations described above in connection with FIGS. 1-4.

The memory 26 may be read only memory (ROM), random access memory (RAM), magnetic disk storage media devices, optical storage media devices, flash memory devices, electrical, optical, or other physical/tangible memory storage devices. In general, the memory 26 may comprise one or more tangible (non-transitory) computer readable storage media (e.g., a memory device) encoded with software comprising computer executable instructions and when the software is executed (by one or more processors) it is operable to perform the operations described herein.

In summary, in one form, a method is provided comprising: receiving a voice call from a caller seeking to speak to a callee; transferring the voice call to an interactive voice response session if the callee does not answer; playing out to the caller audio announcing that the caller can be directed into a callback appointment scheduling process or can leave a voice mail message; communicating with a calendar subsystem to request available appointment times for the callee to call back the caller; receiving from the calendar subsystem a response with available appointment times of the callee; playing out audio announcing the available appointment times to the caller along with a prompt to the caller to choose an appointment time from the available appointment times; receiving a selected appointment time from the caller; and communicating with the calendar subsystem to book the selected appointment time with the callee.

In another form, an apparatus is provided comprising: a network interface unit that enables communication with a telephone network and with a calendar subsystem; and a processor coupled to the network interface unit, wherein the processor is configured to: receive a voice call from a caller seeking to speak to a callee; transfer the voice call to an interactive voice response session if the callee does not answer; play out to the caller audio announcing that the caller can be directed into a callback appointment scheduling process or can leave a voice mail message; send to a calendar subsystem a request for available appointment times for the callee to call back the caller; receive from the calendar subsystem a response with available appointment times of the callee; play out audio announcing the available appointment times to the caller along with a prompt to the caller to choose an appointment time from the available appointment times; receive a selected appointment time from the caller; and send to the calendar subsystem a message to book the selected appointment time with the callee.

In still another form, a non-transitory computer readable storage media is provided encoded with instructions that, when executed by a processor, cause the processor to perform operations comprising: receiving a voice call from a caller seeking to speak to a callee; transferring the voice call to an interactive voice response session if the callee does not answer; playing out to the caller audio announcing to the caller can be directed into a callback appointment scheduling process or can leave a voice mail message; communicating with a calendar subsystem to request available appointment times for the callee to call back the caller; receiving from the calendar subsystem a response with available appointment times of the callee; playing out audio announcing the available appointment times to the caller along with a prompt to the caller to choose an appointment time from the available appointment times; receiving a selected appointment time from the caller; and communicating with the calendar subsystem to book the selected appointment time with the callee.

The above description is intended by way of example only. Various modifications and structural changes may be made therein without departing from the scope of the concepts described herein and within the scope and range of equivalents of the claims.

What is claimed is:

1. A method comprising:
   receiving a voice call from a caller seeking to speak to a callee;
   transferring the voice call to an interactive voice response session if the callee does not answer;
   playing out to the caller audio announcing that the caller can be directed into a callback appointment scheduling process or can leave a voice mail message;
   communicating with a calendar subsystem to request available appointment times for the callee to call back the caller;
   receiving from the calendar subsystem a response with available appointment times of the callee, wherein the available appointment times received from the calendar subsystem include one or more callee specified time slots which have been designated to remain available specifically for automatic scheduling of callback appointments;
   playing out audio announcing the available appointment times to the caller along with a prompt to the caller to choose an appointment time from the available appointment times;
   receiving a selected appointment time from the caller; and
   communicating with the calendar subsystem to book the selected appointment time with the callee.

2. The method of claim 1, wherein receiving the selected appointment time from the caller comprises receiving voice audio from the caller.

3. The method of claim 1, further comprising receiving from the caller personal data for use in booking the appointment with the callee.

4. The method of claim 1, further comprising:
   receiving an appointment confirmation from the calendar subsystem;
   communicating the appointment confirmation to the caller; and
   terminating the voice call with the caller.

5. The method of claim 4, wherein communicating the appointment confirmation to the caller comprises playing out audio to the caller.

6. The method of claim 5, wherein communicating the appointment confirmation to the caller comprises sending a text message to the caller.

7. The method of claim 1, wherein receiving the selected appointment time comprises receiving voice audio for the selected appointment time.

8. The method of claim 1, further comprising receiving from the caller personal data to be included in the appointment booked with the callee.

9. The method of claim 1, further comprising receiving from the callee information for the one or more time slots specifically designated by the callee to remain available for callback appointments.

10. An apparatus comprising:
    a network interface unit that enables communication with a telephone network and with a calendar subsystem;
    a processor coupled to the network interface unit, wherein the processor is configured to:
      receive a voice call from a caller seeking to speak to a callee;
      transfer the voice call to an interactive voice response session if the callee does not answer;
      play out to the caller audio announcing that the caller can be directed into a callback appointment scheduling process or can leave a voice mail message;
      send to a calendar subsystem a request for available appointment times for the callee to call back the caller;
      receive from the calendar subsystem a response with available appointment times of the callee, wherein the available appointment times received from the calendar subsystem include one or more callee specified time slots which have been designated to remain available specifically for automatic scheduling of callback appointments;
      play out audio announcing the available appointment times to the caller along with a prompt to the caller to choose an appointment time from the available appointment times;
      receive a selected appointment time from the caller; and
      send to the calendar subsystem a message to book the selected appointment time with the callee.

11. The apparatus of claim 10, wherein the selected appointment time from the caller comprises voice audio from the caller.

12. The apparatus of claim 10, wherein the processor is further configured to receive from the caller personal data for use in booking the appointment with the callee.

13. The apparatus of claim 10, wherein the processor is further configured to:
    receive an appointment confirmation from the calendar subsystem;
    communicate the appointment confirmation to the caller; and
    terminate the voice call with the caller.

14. The apparatus of claim 13, wherein the processor is configured to communicate the appointment confirmation by playing out audio to the caller.

15. The apparatus of claim 13, wherein the processor is configured to communicate the appointment confirmation by sending a text message to the caller.

16. A non-transitory computer readable storage media encoded with instructions that, when executed by a processor, cause the processor to perform operations comprising:
- receiving a voice call from a caller seeking to speak to a callee;
- transferring the voice call to an interactive voice response session if the callee does not answer;
- playing out to the caller audio announcing to the caller can be directed into a callback appointment scheduling process or can leave a voice mail message;
- communicating with a calendar subsystem to request available appointment times for the callee to call back the caller;
- receiving from the calendar subsystem a response with available appointment times of the callee, wherein the available appointment times received from the calendar subsystem include one or more callee specified time slots which have been designated to remain available specifically for automatic scheduling of callback appointments;
- playing out audio announcing the available appointment times to the caller along with a prompt to the caller to choose an appointment time from the available appointment times;
- receiving a selected appointment time from the caller; and
- communicating with the calendar subsystem to book the selected appointment time with the callee.

17. The non-transitory computer readable storage media of claim 16, wherein the selected appointment time from the caller comprises voice audio from the caller.

18. The non-transitory computer readable storage media of claim 16, further comprising instructions operable for:
- receiving an appointment confirmation from the calendar subsystem;
- communicating the appointment confirmation to the caller; and
- terminating the voice call with the caller.

19. The non-transitory computer readable storage media of claim 18, wherein the instructions for communicating the appointment confirmation comprise instructions for playing out audio to the caller.

20. The non-transitory computer readable storage media of claim 18, wherein the instructions for communicating the appointment confirmation comprise instructions for sending a text message to the caller.

21. The apparatus of claim 10, wherein the processor is further configured to receive from the callee information for the one or more time slots specifically designated by the caller to remain available for callback appointments.

22. The non-transitory computer readable storage media of claim 16, further comprising instructions that cause the processor to receive from the callee information for the one or more time slots specifically designated by the caller to remain available for callback appointments.

* * * * *